United States Patent [19]
Hidalgo

[11] Patent Number: 5,967,383
[45] Date of Patent: Oct. 19, 1999

[54] CONTAINER AND COUPLER ASSEMBLY FOR TRANSFERRING GRANULATED MATERIAL

[76] Inventor: Edgar Hidalgo, 100 N. Fab. Pozuelo La Uruca, San Jose Apdo. 38-1150, Costa Rica

[21] Appl. No.: 09/137,862
[22] Filed: Aug. 14, 1998
[30] Foreign Application Priority Data
Nov. 21, 1997 [CR] Costa Rica .................................. 5652
[51] Int. Cl.$^6$ ...................................................... B67D 3/00
[52] U.S. Cl. .......................... 222/516; 222/485; 222/143; 222/548; 141/346; 141/383; 141/351; 141/364; 141/384; 141/18
[58] Field of Search ..................................... 141/2, 18, 21, 141/349, 383, 384, 386, 364, 375, 351–354, 346; 222/143, 485, 516, 548

[56] References Cited

U.S. PATENT DOCUMENTS

| 2,818,997 | 1/1958 | Henchert | 222/143 |
| 3,410,462 | 11/1968 | Donovan | 222/516 |
| 3,731,717 | 5/1973 | Potash . | |
| 3,885,608 | 5/1975 | Ayres . | |
| 4,183,443 | 1/1980 | DeParales et al. | 222/548 |
| 4,346,823 | 8/1982 | Eppenbach | 222/548 |
| 4,805,793 | 2/1989 | Brandt et al. | 222/143 |
| 5,425,404 | 6/1995 | Dyer | 141/351 |
| 5,456,294 | 10/1995 | Tsao et al. . | |
| 5,634,505 | 6/1997 | Tak-Yiu Wong . | |
| 5,641,012 | 6/1997 | Silversides | 141/383 |

FOREIGN PATENT DOCUMENTS 2519  6/1997  Costa Rica ........................ B65B 3/12

Primary Examiner—David J. Walczak
Assistant Examiner—Khoa Huynh
Attorney, Agent, or Firm—J. Sanchelima

[57] ABSTRACT

A coupling system for transferring granular contents from a container to a pump dispenser with minimum risk of direct contact with a user. The coupling system includes a connecting threaded assembly that is frictionally and snugly mounted inside the neck of the container. The upper wall of the connecting threaded assembly includes at least one off-centered opening. A cap assembly is rotatably and coaxially mounted over the connecting threaded assembly and the former also includes at least one off-centered opening that is selectively made to coincide with the off-centered opening of the connecting threaded assembly. A spring is used to bias these two assemblies to make the respective off-centered openings not to coincide. A coupling ring assembly is firmly mounted inside the neck of a pump dispenser. The cap assembly engages the coupling ring assembly with at least one of its protuberances that extend radially outwardly into the L-shape slots on the internal surface of the coupling ring assembly. A gasket member is used to achieve a hermetic sealing engagement between the dispenser and the container. Eyed tabs cooperatively and rigidly mounted on the container's frustroconical portion and the connecting threaded assembly permit the use of sealing wires. A user can dispense granulated material from the container to a dispenser by achieving a hermetically sealed engagement without coming in contact with the material.

5 Claims, 5 Drawing Sheets

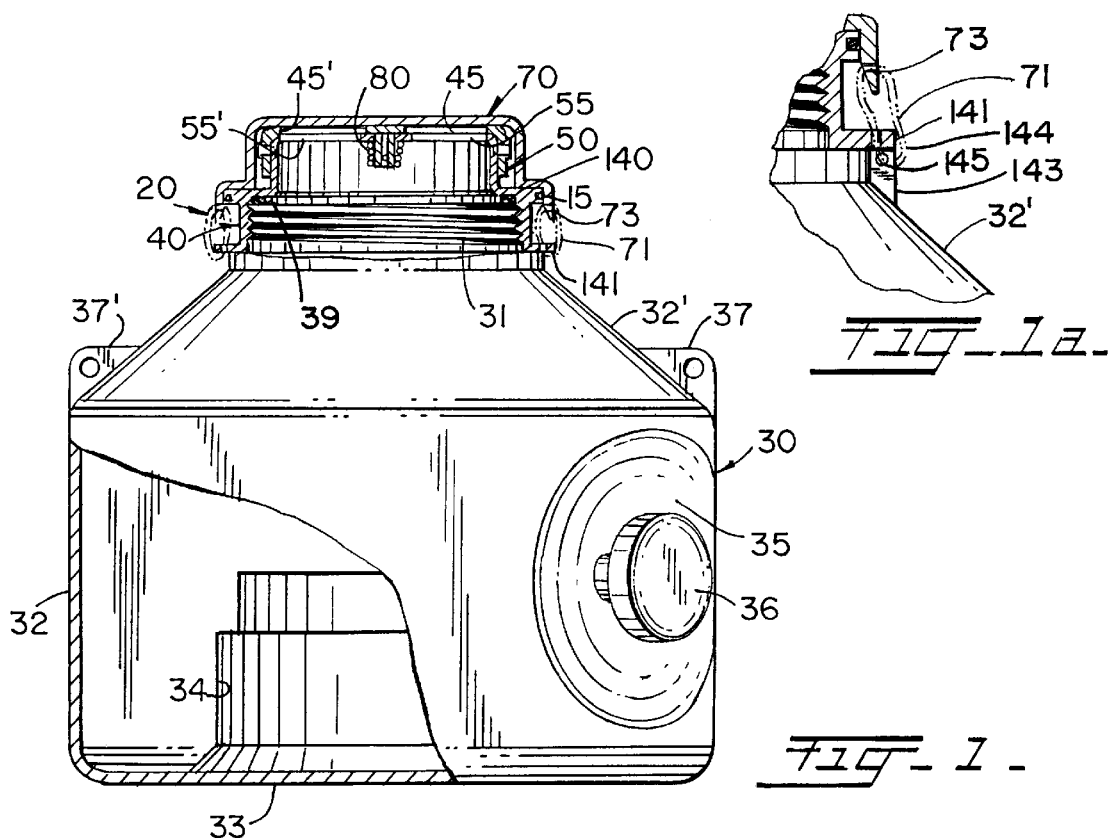
Fig. 1
Fig. 1a
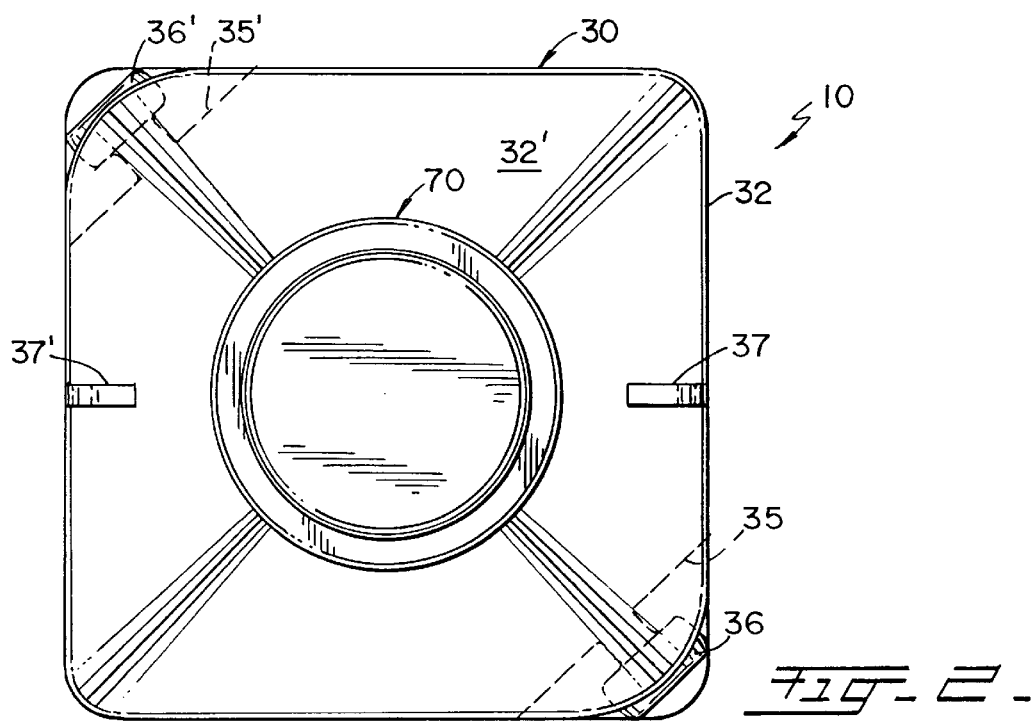
Fig. 2

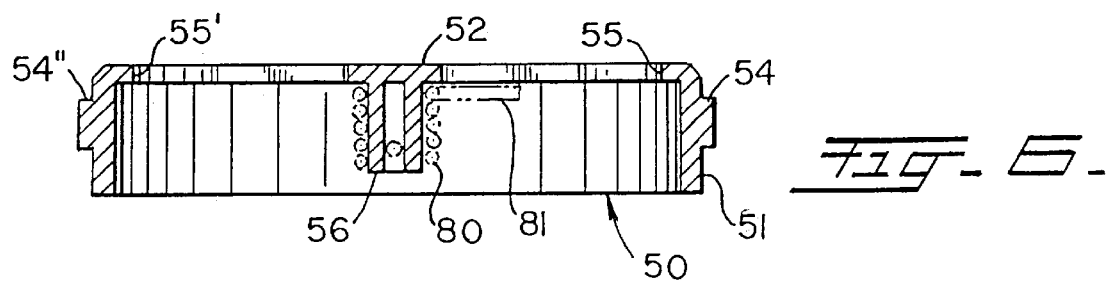
Fig. 6.
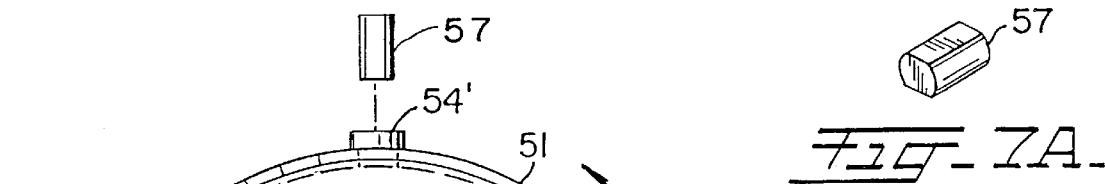
Fig. 7A.
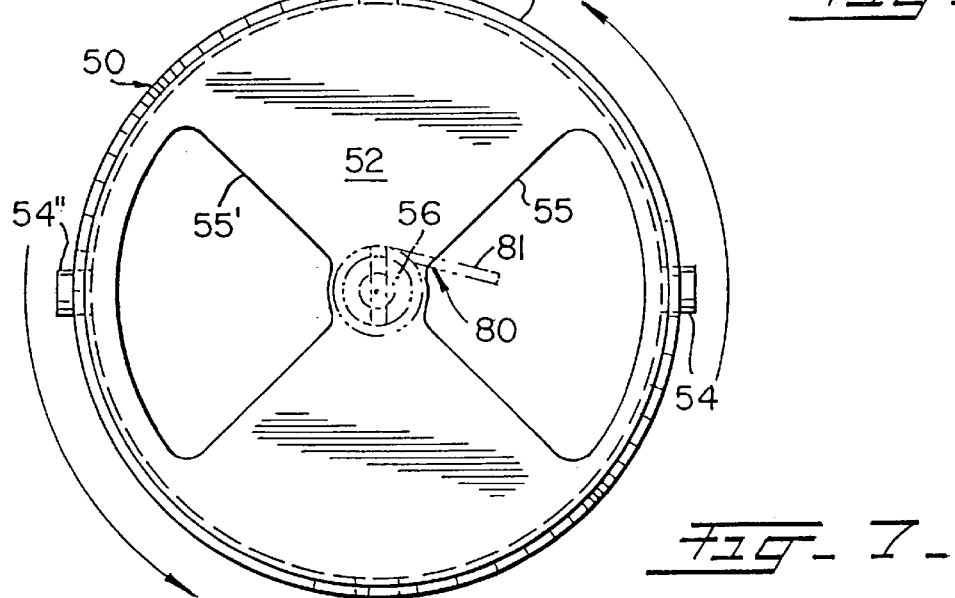
Fig. 7.
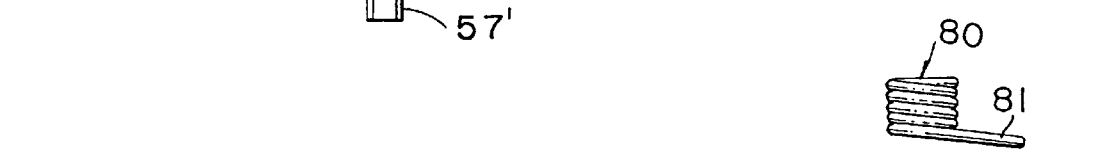
Fig. 9A.
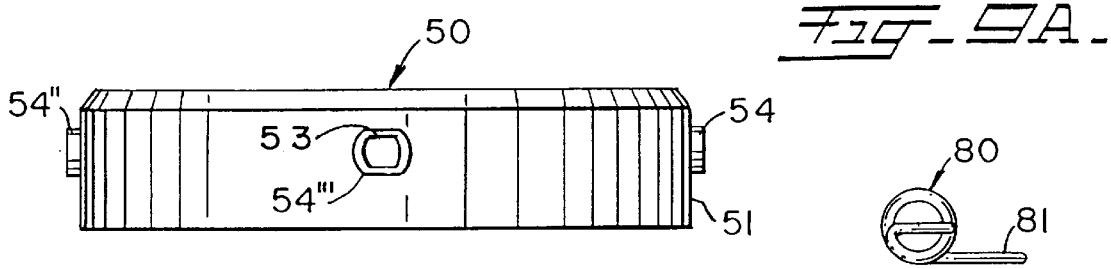
Fig. 8.
Fig. 9B.

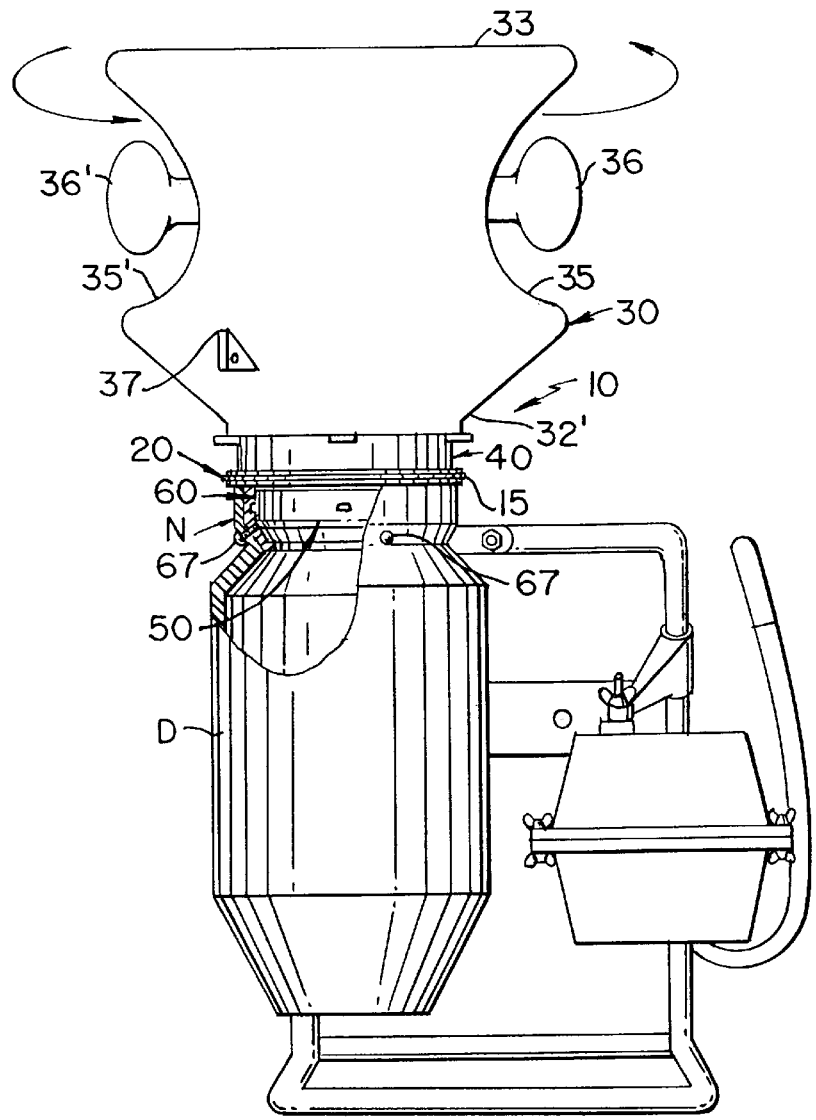
Fig_14
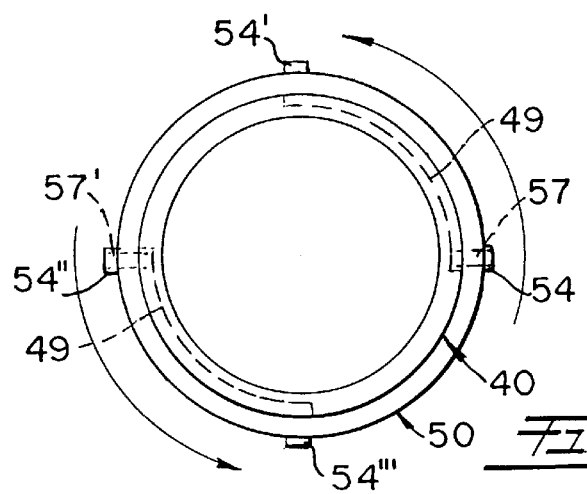
Fig_15

5,967,383

CONTAINER AND COUPLER ASSEMBLY FOR TRANSFERRING GRANULATED MATERIAL

BACKGROUND OF THE INVENTION

1. Field of the Invention

The present invention relates to a coupler assembly including a container to connect the latter to a pump-dispenser and transfer its granulated content, such as toxic substances or the like, with minimum risk of spillage or contact with the user. The user causes the granulated contents to be transferred without direct contact.

2. Description of the Related Art

Applicant believes that the closest reference corresponds to U.S. Pat. No. 5,456,294 to Tsao et al. (1995) for a non-spill bottled water replacement system with a shielded disposable cap. While contact with the user is avoided, it relies on a hydraulic shock wave that may be dangerous when the application is for toxic substances. Other U.S. Pat. Nos., 5,634,505 (1997), 3,885,608 (1975), and 3,731,717 (1973), describing the closest subject matter provide for a number of more or less complicated features that fail to solve the problem in an efficient and economical way. These patented inventions were designed for liquids and gases, not granulated materials. U.S. Pat. No. 5,634,505 to Wong (1997) for a refueling system is primarily directed to a mechanism for quick engagement with a mating receiver and the incorporation of these teachings in the present invention will not serve the purposes of handling granulated material. Applicant's own Costa Rica patent No. 2519 issued on Jun. 19, 1997 and entitled "Coupling System between Pump and Container for Loading and Unloading of Granulated Agro-chemical Products and Others" is relevant in the definition of the problem and one of the early solutions found by the Applicant. The present invention improves upon the original invention by providing, inter alia, the L-shaped slots and spring mechanisms that further facilitate the safe transfer of granulated material from a container to a dispenser. None of these patents suggest the novel features of the present invention.

SUMMARY OF THE INVENTION

It is one of the main objects of the present invention to provide a container and coupler assembly that avoids physical contact by a user with containers' granulated contents when stored, transported and transferred from one container to another especially when harmful toxic substances are involved.

It is another object of this invention to provide a container and coupler assembly that are hermetic so that water, such as rain water, cannot be penetrated to its contents even if left exposed to the elements. Most of these chemicals react when exposed to water.

It is still another object of the present invention to provide a container and coupler assembly that can be mounted to conventional pump dispensers to dispense substances, such as nematicids, insecticides, fertilizers, and others. Additionally, the present invention provides a container and coupler assembly that when opened (for granulated material to pass through) it cannot be disengaged from the pump dispenser being loaded. Thus, the present invention also provides a secure container for storage and transportation.

Another object of the present invention is to provide a container and coupler assembly that has such a structure that facilitates its storage and manipulation with minimum effort.

It is yet another object of this invention to provide such a device that is inexpensive to manufacture and maintain while retaining its effectiveness. Further objects of the invention will be brought out in the following part of the specification, wherein a detailed description is given for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an elevational partial cross-sectional view of a preferred embodiment for the container and coupling assembly.

FIG. 1A is a detailed partial cross-sectional view showing one of the seals.

FIG. 2 is a top view of the container showed in FIG. 1.

FIG. 6 is an elevational cross-sectional view of a spring biased cap assembly, showing a spring in phantom.

FIG. 7 is a top view of the spring biased cap assembly with guiding members, and with the spring shown in phantom.

FIG. 7A is an isometric view of the guiding members.

FIG. 8 is an elevational view of the spring biased cap assembly.

FIG. 9A is an elevational view of the spring shown in FIGS. 6 and 7.

FIG. 9B is a bottom view of the spring.

FIG. 14 represents the preferred application of the present invention, when the container is mounted (or coupled) to a pump-dispenser D by the coupling assembly.

FIG. 15 is a partial representation of the coupling of spring biased cap assembly 50 with connecting threaded assembly 40, and showing the 90 degree angular path of guiding members inside guiding slots 49 and 49'.

DETAILED DESCRIPTION OF THE PREFERRED EMBODIMENT

Figure 3:
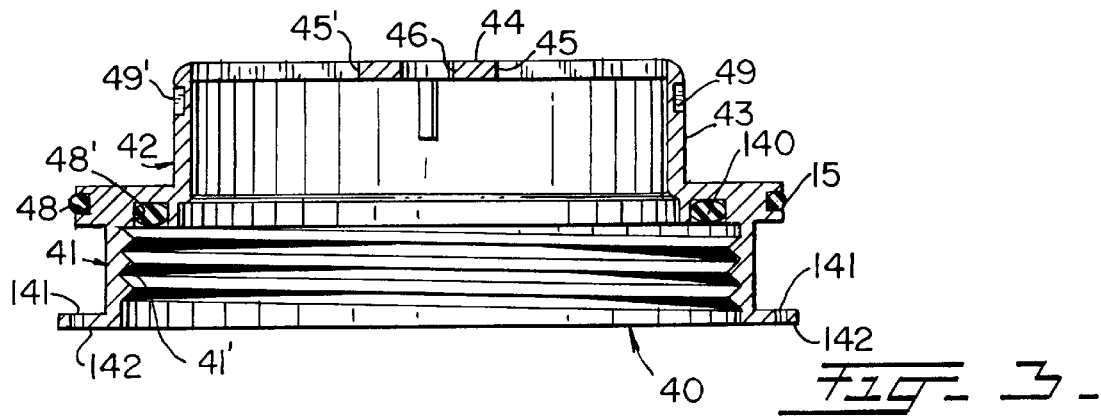
FIG. 3 is an elevational cross-sectional view of the connecting threaded assembly illustrated in FIG. 1.
Figure 4:
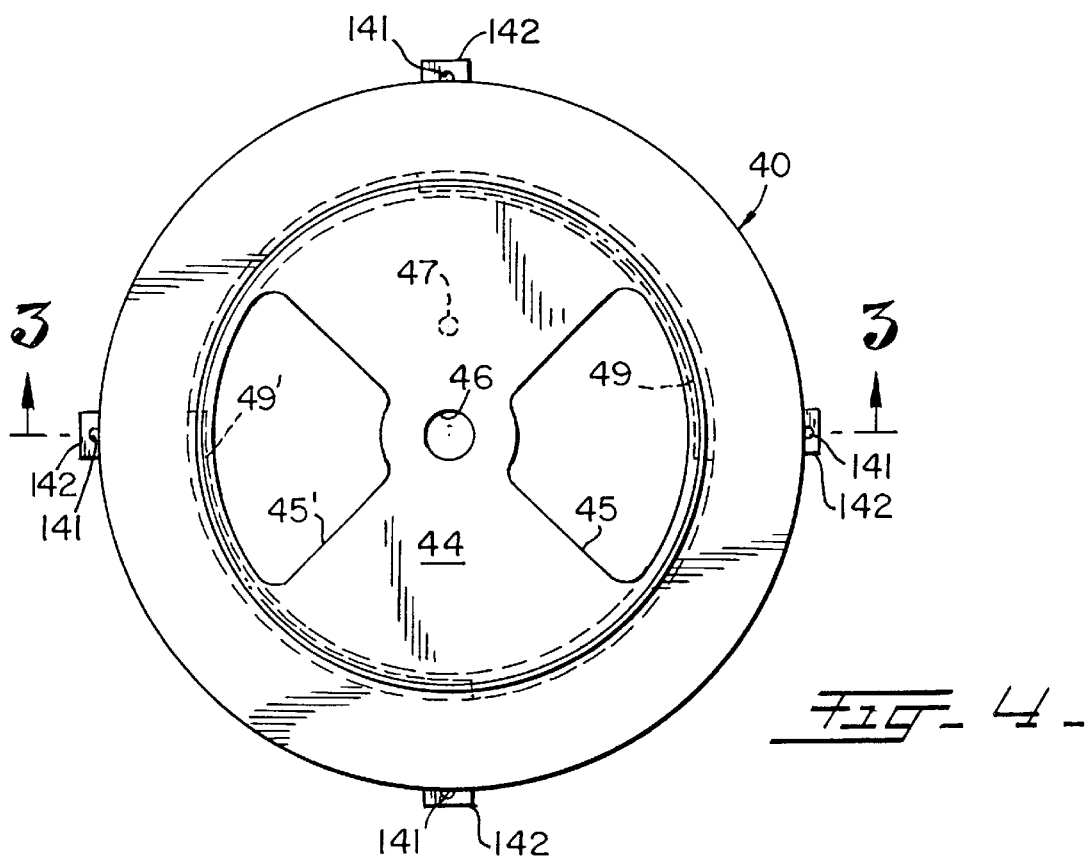
FIG. 4 is a top view of the connecting threaded assembly.
Figure 5:
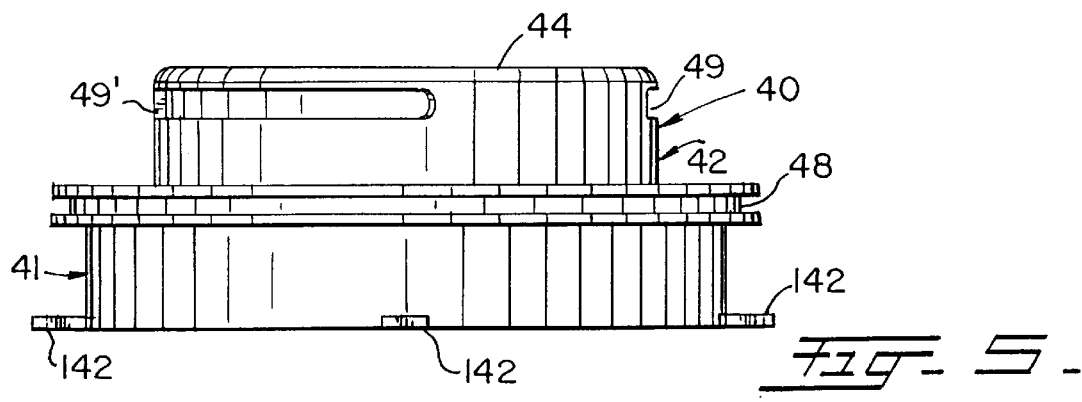
FIG. 5 is an elevational view of the connecting threaded assembly.

Referring now to the drawings, where the present invention is generally referred to with numeral 10, it can be observed that it basically includes coupler assembly 20 that is removably mounted to container 30. As shown in FIG. 1, coupler assembly 20 includes connecting threaded assembly 40, spring biased round cap assembly 50 and cover member 70.

Connecting threaded assembly 40 is mounted to threaded neck 31 of container 30. Container 30 includes rim 39. Spring biased cap assembly 50 is mounted to assembly 40, and cover member 70 is removably mounted covering the former. Cover member 70 is secured to connecting threaded assembly 40 with removable securing seal 71. Securing seal 71 passes through openings 73 located in the lowermost portion of stepped skirt 72 and openings 141 of assembly 40. Additionally, the present invention includes coupling ring assembly 60 that is used on pump dispenser D. Coupling ring assembly 60 is snugly mounted inside neck N of pump dispenser D, as best seen in FIG. 14. Coupler assembly 20 is designed to permit a user to refill pump dispenser D with granulated substance or other similar products from container 30. Eyed tab is rigidly and perpendicularly mounted to the uppermost end of upper frustroconical portion 32' and extends longitudinally there along. Securing seal 144 is passed through opening 145 in eyed tab 143, respectively, and also through opening 141 as best seen in FIG. 1A.

It is possible to use more than one seal 144 with associated opening 73 so that different securing seals 144 can be used. Thus, a seal can be used to prevent the unauthorized removal of cover member 70 while still protecting the contents with another seal (typically of a different color) using opening 145. In the field, a worker is allowed to remove the seal associated with cover member 70 but not the seal associated with coupler assembly 20 thereby protecting the contents from adulteration. Container 30 has threaded neck 31, lateral wall 32 with upper frustroconical portion 32' that extends perpendicularly from bottom wall 33. As illustrated in FIG. 1, bottom wall 33 has inwardly extending portion 34 that has a cooperating shape to receive cover member 70 mounted thereon. Thus, containers 30 are stackable and volumetrically efficient to store and transport. Container 30, in the preferred embodiment, has depressions 35 and 35' located at opposite sides of lateral wall 32. Container 30 also includes handle members 36 and 36' perpendicularly mounted to the central section of depressions 35 and 35', respectively. Handle members 36 and 36', in the preferred embodiment, have round or mushroom-like shape and are cooperatively located below the middle point of gravity of the body of container 30. This permits a user to easily turn container 30 up side down and transfer the content to pump dispenser D. Container 30 also includes eyed tabs 37 and 37' rigidly and perpendicularly mounted to upper frustroconical portion 32'. Eyed tabs 37 and 37' receive a core or wire permitting a user to hang up and/or carry container 30 if needed.

Connecting threaded assembly 40, as best seen in FIGS. 3; 4 and 5, includes threaded portion 41 and spout portion 42. Threaded portion 41 includes internal thread 41' that has cooperative dimensions to removably engage to threaded neck 31 of container 30. Tabs 142 are outwardly and perpendicularly mounted to the outer surface of threaded portion 41. As above mentioned, tabs 142 includes openings 141 to cooperatively receive securing seal 71. Spout portion 42 includes lateral wall 43 and upper wall 44. Upper wall 44 includes openings 45 and 45', and central opening 46. Retaining pin 47 is perpendicularly mounted to the underside of upper wall 44. Assembly 40 also includes peripheral slot 48 located between threaded portion 41 and spout portion 42, and it includes cooperative dimensions to receive sealing O-ring member 15. Member 15 will come into sealing contact with skirt 72 of cover member 70, as it will be described below. As seen in FIG. 3, internal groove 48' is located adjacent to internal thread 41', and is designed to snugly receive gasket member 140 to achieve the necessary hermeticism to protect the container's contents from water and/or humidity. Assembly 40 also includes guiding slots 49 and 49' defined in lateral wall 43 and designed to limit the travel of spring biased cap assembly 50, as it will be described below.

Spring biased cap assembly 50, as illustrated in FIGS. 6; 7 and 8, basically has peripheral wall or skirt 51 and upper wall 52. Peripheral wall or skirt 51 includes outwardly extending protuberances 54; 54'; 54" and 54'". Protuberances 54' and 54'" have apertures 53 and 53', as shown in FIG. 7. Once spring biased cap assembly 50 is mounted on connecting threaded assembly 40, guiding pin members 57 and 57' are passed through apertures 53 and 53' and guiding slots 49 and 49', as best seen in FIG. 15. In this manner, spring biased cap assembly 50 is secured to connecting threaded assembly 40 allowing the 90 degrees angular displacement of the former with respect to assembly 40 and container 30. Upper wall 52 has off-centered openings 55 and 55' having dimensions that are similar to off-centered openings 45 and 45' so that when they coincide, the resulting clearance allows the toxic granulated substance to go through. Spring biased cap assembly 50 also includes perpendicularly extending tubular member 56 mounted to the underside of upper wall 52. As described above, spring biased cap assembly 50 is mounted on connecting threaded assembly 40 and tubular member 56 is inserted through central opening 46. Spring member 80 is then mounted around tubular member 56 and spring end 81 is biased against retaining pin 47. Spring member 80 is shown in FIGS. 9A and 9B. Spring member 80 maintains spring biased cap assembly 50 in closed position (openings 55 and 55' do not coincide with openings 45 and 45'). A user has to apply a predetermined force to assembly 50 to overcome the spring bias. When off-centered openings 55 and 55' coincide with off-centered openings 45 and 45' the contents go through. Rotational force is applied indirectly by a user rotating container 30, described below.

Figure 10:
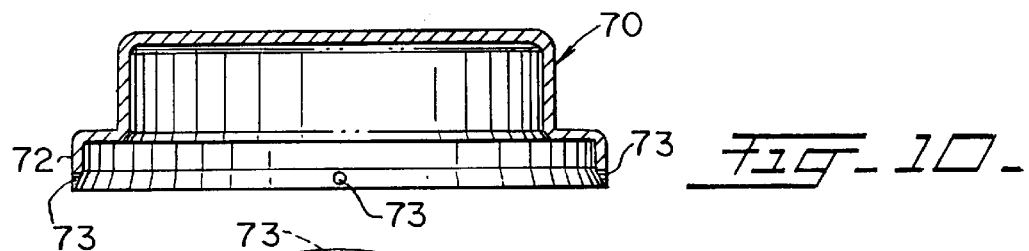
FIG. 10 is an elevational cross-sectional view of the cover member used in the preferred embodiment.
Figure 11:
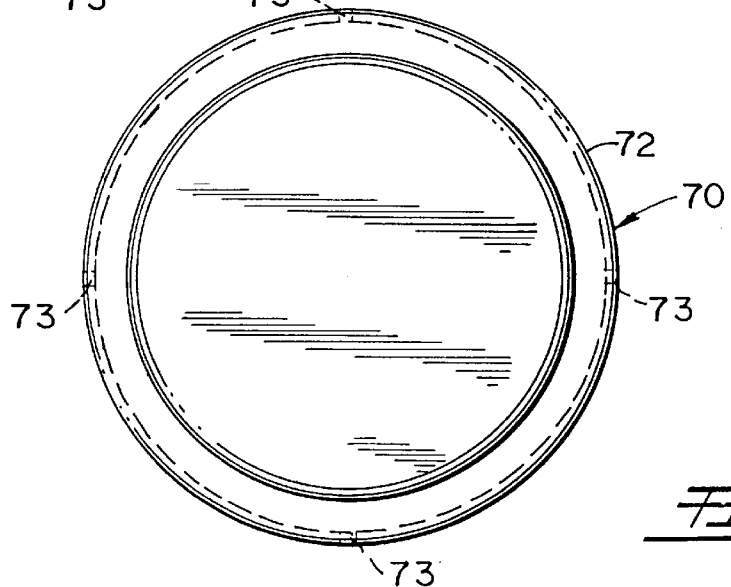
FIG. 11 is a top view of the cover member.

FIGS. 10 and 11 show cover member 70 used in one of the preferred embodiments. It includes stepped skirt 72 that comes in sealing contact with O-ring member 15.

Figure 12:
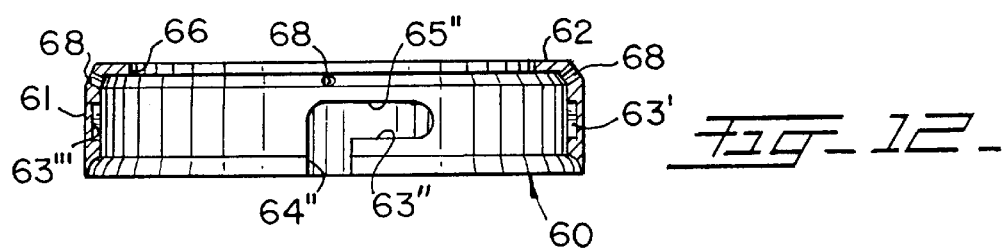
FIG. 12 is an elevational cross-sectional view of a coupling ring assembly.
Figure 13:
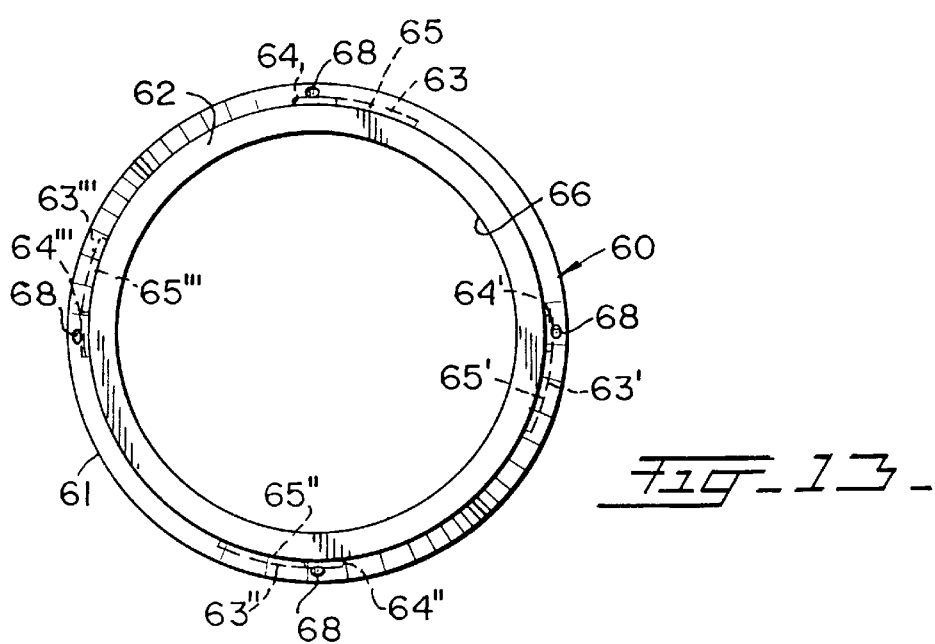
FIG. 13 is a top view of the coupling ring assembly.

FIGS. 12 and 13 show coupling ring assembly 60. Coupling ring assembly 60 is snugly mounted inside neck N of pump dispenser D, as illustrated in FIG. 14, and permits a user to mount spring biased cap assembly 50 to pump dispenser D and thus, container 30. Coupling ring assembly 60, in the preferred embodiment, has peripheral wall or skirt 61 and inwardly extending upper wall 62. Peripheral wall or skirt 61 is in frictional contact with the inner surface of neck N of conventional pump dispenser D, as best seen in FIG. 14. Coupling ring assembly 60 is kept in place by securing members 67, as shown in FIG. 14. Securing members 67 pass through openings disposed in neck N and openings 68 disposed in skirt 61 of assembly 60. Peripheral wall or skirt 61 includes L-shaped slots 63; 63'; 63" and 63'" that are located equidistant from each other. Slots 63; 63'; 63" and 63'", in the preferred embodiment, have an "L" configuration defined by vertical portions 64; 64'; 64" and 64'" and horizontal portions 65; 65'; 65" and 65'", respectively. When spring biased cap assembly 50 is mounted to coupling ring assembly 60, protuberances 54; 54'; 54" and 54'" first slide along vertical portions 64; 64'; 64" and 64'" and then horizontal portions 65; 65'; 65" and 65'". In this manner, coupling ring assembly 60 is secured in place. Any further rotation of container 30 exerts a force against threaded connecting assembly 40 (which is rigidly mounted to container 30). This force is transmitted through pin members 57 and 57' causing the bias of spring member 80 to be overcome thereby moving assembly 50 with respect to assembly 40. Proportionally with the force applied, openings 45; 45' and 55; 55' will coincide more or less. The inner edge of upper wall 62 defines opening 66. When the couplement between pump-dispenser D, coupler assembly 20 and container 30 is established, the granulated content can be transferred from container 30 to dispenser D and vice versa through openings 45; 45'; 55; 55' and 66. Coupling ring assembly 60 is fixed inside pump-dispenser D and a user rotates container 30 overcoming the bias of spring biased cap assembly 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A coupling system for transferring granular contents from inside a container; wherein the container has a peripheral wall, a neck with an external thread thereon and a rim, to a pump dispenser also having a neck with an internal wall, said coupling system comprising:

a) a connecting threaded assembly having substantially an annular shape with a threaded portion and a spout portion, said threaded portion includes an internal thread that is cooperatively engageable with said external thread, and said spout portion having a first peripheral wall having first inner and outer surfaces and a first upper wall perpendicularly and inwardly extending from said first peripheral wall, said first upper wall includes a central opening and at least one first off-centered opening, and said first upper wall further including a first underside having a retaining pin member mounted perpendicularly thereon at an off-centered location, and said first outer surface including at least one peripheral slot running parallel to said first upper wall;

b) a cap assembly including a second peripheral wall having second inner and outer surfaces and a second upper wall extending perpendicularly and inwardly therefrom, the outer surface of said second peripheral wall includes at least one protuberance and at least one of said protuberances having a through aperture and at least one guiding pin member having cooperative dimensions to pass through said aperture and protruding inside said peripheral slot, said second upper wall including a second underside having a tubular member centrally mounted thereon and with cooperative dimensions to be received through said central opening, said second upper wall includes at least one second off-centered opening in rotatable cooperative and selective alignment with said first off-centered opening, and further including spring means for biasing said cap assembly to a position where said first and second off-centered openings do not coincide and the inner surface of said second peripheral wall having cooperative dimensions to receive said first peripheral wall;

c) a coupling ring assembly having cooperative dimensions to be frictionally and snugly receivable within the neck of said pump dispenser, said coupling ring assembly includes a third peripheral wall having at least one L-shaped slot having cooperative dimensions to receive said protuberances so that the spring bias on said cap assembly can be selectively overcome to make said first and second off-centered openings coincide when said container is rotated; and d) means for hermetically sealing the engagement of said container to said connecting threaded assembly.

2. The coupling system set forth in claim 1 further including:

e) a cover assembly having a fourth peripheral wall having third inner and outer surfaces and a third upper wall extending perpendicularly and inwardly therefrom, said third inner surface having cooperative dimensions to snugly house said second peripheral wall.

3. The coupling system set forth in claim 2 wherein said container includes two handles mounted on said peripheral wall, and said handles being positioned opposite to each other approximately at the center of gravity line so that turning said container for pouring its contents is facilitated.

4. The coupling system set forth in claim 3 further including:

f) security means for preventing the removal of said cover assembly.

5. The coupling system set forth in claim 4, further including:

g) means for hermetically sealing said cover assembly against said connecting threaded assembly.

* * * * *